(12) United States Patent
Spriestersbach et al.

(10) Patent No.: US 7,283,846 B2
(45) Date of Patent: Oct. 16, 2007

(54) INTEGRATING GEOGRAPHICAL CONTEXTUAL INFORMATION INTO MOBILE ENTERPRISE APPLICATIONS

(75) Inventors: Axel Spriestersbach, Karlsruhe (DE); Hartmut Vogler, Foster City, CA (US); Peter Ebert, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 395 days.

(21) Appl. No.: 10/208,201

(22) Filed: Jul. 31, 2002

(65) Prior Publication Data

US 2003/0148775 A1 Aug. 7, 2003

Related U.S. Application Data

(63) Continuation-in-part of application No. 10/134,673, filed on Apr. 30, 2002, now Pat. No. 7,020,494.

(60) Provisional application No. 60/354,284, filed on Feb. 7, 2002, provisional application No. 60/384,825, filed on Jun. 4, 2002.

(51) Int. Cl.
*H04B 1/38* (2006.01)
*H04M 1/00* (2006.01)

(52) U.S. Cl. ............. 455/566; 455/550.1; 455/456.1; 455/456.3

(58) Field of Classification Search ............ 455/404.2, 455/414.1, 414.3, 432.2, 432.3, 456.1, 456.3, 455/458.6, 457, 550.1, 418, 419
See application file for complete search history.

(56) References Cited

U.S. PATENT DOCUMENTS

| | | | | |
|---|---|---|---|---|
| 5,930,699 | A | * | 7/1999 | Bhatia .................... 455/456.3 |
| 5,948,040 | A | * | 9/1999 | DeLorme et al. ........... 701/201 |
| 6,026,375 | A | * | 2/2000 | Hall et al. .................... 705/26 |
| 6,049,711 | A | * | 4/2000 | Ben-Yehezkel et al. .. 455/414.3 |
| 6,088,594 | A | * | 7/2000 | Kingdon et al. ............ 455/457 |
| 6,199,099 | B1 | * | 3/2001 | Gershman et al. .......... 709/203 |
| 6,236,978 | B1 | | 5/2001 | Tuzhilin |
| 6,239,978 | B1 | * | 5/2001 | Liao ........................... 361/756 |
| 7,020,494 | B2 | * | 3/2006 | Spriestersbach et al. .... 455/566 |
| 2001/0018349 | A1 | * | 8/2001 | Kinnunen et al. .......... 455/456 |
| 2002/0045456 | A1 | * | 4/2002 | Obradovich ................ 455/457 |

* cited by examiner

*Primary Examiner*—Lana Le
*Assistant Examiner*—April S. Guzman
(74) *Attorney, Agent, or Firm*—Fish & Richardson P.C.

(57) ABSTRACT

A location context-aware mobile system determines the location of a mobile device and updates a user interface based on the location of the device. By using the location of the mobile device to reduce the amount of information required to be entered by a user in a business process application, the system increases the feasibility of providing business process applications on mobile devices such as mobile telephones.

18 Claims, 7 Drawing Sheets

INTEGRATING GEOGRAPHICAL CONTEXTUAL INFORMATION INTO MOBILE ENTERPRISE APPLICATIONS

CROSS-REFERENCE TO RELATED APPLICATIONS

This application is a continuation-in-part of U.S. application Ser. No. 10/134,673, filed Apr. 30, 2002, now U.S. Pat. No. 7,020,494, titled "INTEGRATING CONTEXTUAL INFORMATION INTO MOBILE ENTERPRISE APPLICATIONS," and claims priority from U.S. Provisional Application No. 60/354,284, filed Feb. 7, 2002, titled "INTEGRATING CONTEXT INFORMATION INTO ENTERPRISE APPLICATIONS FOR MOBILE APPLICATIONS," and U.S. Provisional Application No. 60/384,825, filed Jun. 4, 2002, titled "MOBILE APPLICATION INTEGRATING LOCATION CONTEXT INFORMATION," each of which is hereby incorporated by reference in its entirety for all purposes.

TECHNICAL FIELD

This disclosure relates to the integration of context information in mobile device applications, and more specifically, to the use of geographical context information to customize a user interface for a mobile device, such as a mobile phone or wireless personal digital assistant (PDA).

BACKGROUND

A wide variety of mobile devices have reached the market in the past few years taking advantage of new technologies and standardizations. For example, many mobile phones come equipped with web browsers to allow users to perform such tasks as purchasing goods, checking on the status of deliveries, and booking travel arrangements. Mobile devices include any device capable of providing data processing and/or communication services to a user outside of the office. For example, mobile devices include, but are not limited to, personal digital assistants (PDAs), mobile phones, laptops, pagers, and wireless email devices (e.g., Blackberry).

Over recent years, various applications have been developed for mobile devices, allowing users to performing increasingly more complicated tasks while away from their desks. A tradeoff exists between the size of mobile devices and the capabilities they provide. For example, large displays assist in displaying complex, detailed data; however, a large display would be cumbersome in a mobile device. Many mobile devices provide very small screens, with limited data entry capabilities, thereby making functionally robust or complex applications impractical.

With wider deployment of mobile devices and increased connectivity, interesting new fields for enterprise applications are being developed. In the past, enterprise applications typically have been provided as desktop applications within a well-defined corporate environment. However, with smaller, more powerful mobile devices and increased connectivity, it is more and more feasible to carry out business transactions on mobile devices. Thus, corporate backend data processing systems need to be accessed remotely with transactions initiated anywhere connectivity is available.

In the past, desktop applications in the corporate environment have taken advantage of the processing power and large display screens in providing sophisticated graphical user interfaces allowing users to view and enter large amounts of data efficiently. The requirements of mobile devices are substantially different to those of desktop systems, with power consumption and size becoming much more important than processing power, display sizes, and ease of data entry.

Mobile devices, such as mobile phones and personal digital assistants (PDAs) typically have small screens, minimal processing power, little storage capacity, low bandwidth network connectivity, and limited data input capabilities. For example, many mobile phones have very small screens, capable of displaying only a few short lines of text. Also, mobile phones typically do not include a keyboard, requiring users to use cumbersome techniques to input textual data. One common mobile telephone data entry method assigns multiple letters to a single button, such as, "A," "B," and "C" to the button marked "1." To enter an "A," a user places the device into a text data entry mode, and presses the "1" button. To enter a "B," the user presses the "1" button twice. Finally, to enter a "C," the user presses the "1" button three times. Clearly, it is difficult and cumbersome to enter large amounts of data in this manner.

As discussed above, the movement from the desktop in the corporate environment to the mobile environment has significantly changed the platforms used for corporate applications. In the past, enterprise applications typically process large amounts of data and require large amounts of data entry. While this constitutes no problem on the desktop, it may be problematic when using mobile devices. The limiting factors mentioned above do not facilitate complex input and output on mobile devices.

Real-time access to enterprise data and applications for the mobile workforce, such as sales representatives or service technicians, is a crucial factor for enterprises. Today, many workflows, especially for employees on the road, are still paper-based, lacking in automated processing and backend integration. With the introduction and widespread use of lightweight, inexpensive mobile devices as well as the increased coverage of wireless data networks, mobile solutions have become desirable for broad usage in the mobile workforce.

As the mobility of the workforce increases, more and more corporate workflows will require migration to or at least support for mobile platforms. Because of the limitations of mobile devices, new paradigms for data input and presentation are needed to fully leverage the power and benefits of mobile devices.

SUMMARY

In one general aspect, a location context-aware system is provided that integrates geographical contextual information. The system includes a mobile device, a location service operable to determine a location of the mobile device, a mobile application server coupled to the mobile device providing a business process application, and a geographical information service application coupled to the mobile application server. This location information and business process data from the geographical information service application are used to modify a user interface provided by the business process application. The system also may include a backend enterprise server coupled to the mobile application server to provide business process data.

The location identifier device may be implemented as a beacon that emits an infrared or radio-frequency signal identifying the location of the beacon. Additionally, the location identifier may be provided by a global positioning system (GPS) receiver. The location identifier may also be provided through a conductive cable. A sensor is used to receive signals, such as the infrared or radio-frequency signals from a beacon.

In some implementations, the backend enterprise server includes a customer relationship management application, and the business process data includes customer data. The user interface includes a user input field. The mobile application server modifies the user interface by setting the value of the user input field using the business process data. The user input field may be hidden from the user, or may be displayed with the corresponding value of the user input field set by the mobile application server. Additionally, the mobile application server may modify the user interface by providing a selection of possible values using the business process data.

The mobile device may be provided, for example, as a personal digital assistant (PDA) or a mobile telephone.

In another general aspect, a method of modifying a user interface using location context information includes identifying the location of a mobile device, retrieving information regarding the location of the mobile device, modifying a user interface using the retrieved information, and displaying the modified user interface on the mobile device.

The location of the mobile devices may be identified by receiving a location identifier from a location identifier device. The location identifier may specify a physical location or a contextual location. Information about the location then may be retrieved from a backend enterprise server. The location identifier may then be used to modify the user interface.

In another general aspect, a computer program implementing a location contextaware user interface on a mobile device includes a location identification code segment to determine the location of the mobile device, an information dispatch code segment to retrieve information about the location of the mobile device, a user interface generation code segment to modify a user interface based on the location of the mobile device, and a user interface display code segment to display the modified user interface.

There is a need for techniques to simplify user interfaces for mobile devices. One strategy is to provide more intelligent, context-aware applications that can tailor data entry and user interfaces based on various available information, such as, a user's habits, the location of the device, and available related data.

The details of one or more implementations are set forth in the accompanying drawings and the description below. Other features and advantages will be apparent from the description and drawings, and from the claims.

DETAILED DESCRIPTION

Enterprise business applications may be developed for mobile devices by using context-awareness to simplify user interfaces, reducing the amount of data that users must enter. To better describe the types of context information that may be used, we can define three components of context information: (1) activity; (2) environment; and (3) self. The activity component describes the task a user is working on, focusing on the user of the device, and his or her habits and behavior. For example, a sales representative may typically engage in several activities including: entering sales orders; checking the status of order fulfillments; submitting travel and expense reports; and interacting with a customer relationship management (CRM) system. Thus, the activity component of contextual information may include the activity the sales representative is presently performing and the past habits of the sales representative in performing those tasks. For example, when entering data in a paper or desktop-based travel and expense reporting system, a sales representative may typically fill in many of the fields in the same manner. The activity context would include the user's task (i.e., expense reporting) and the user's habits (i.e., filling in fields such as a name field, telephone extension field, and employee identification number field with the sales representative's information).

The environment describes the physical and social surrounding of the user, such as, the current location, activities in the environment, and other external properties like temperature and humidity. Environment context information may be obtained through devices such as radio frequency identification tags (RFIDs), radio frequency or infrared beacons, and the global positioning system (GPS). Additional information such as the temperature, barometric pressure, and humidity may also be obtained through sensors connected to or incorporated in the mobile device, or through a communications channel, such as, a local area network, the Internet, or a wireless network (e.g., the general packet radio system (GPRS)).

Finally, the self component contains the status of the device itself. This component has been widely used by many desktop applications. Status information may include any information about the device including resource utilization, internal temperature, network status, and battery charge state. The self component may also include local configuration or status information, such as, the current user of the device or other user profile identification.

This disclosure focuses predominantly on the use of location component of context awareness in mobile applications, and the derivation of implicit context information belonging to a particular location. Location awareness may be further divided into two general categories: (1) physical location; and (2) semantic location. Physical location specifies the location of an object based on some global coordinate system (e.g., the latitude and longitude of the device). This information may be provided with varying degrees of precision.

Semantic location specifies the position of an object within a larger context. For example, a conference room, shopping mall, bus stop, or the bus itself. Typically, a context stores some additional information about a local environment and its resources. For example, imagine a passenger traveling on a public bus with the ability to access a web page associated with the bus to determine the arrival time at a particular destination. The physical location of the passenger is not sufficient location information to provide the desired information; the system also needs the semantic location information about the passenger's location on a public bus, and perhaps, additional information regarding the route of the bus.

Additionally, semantic location information may be hierarchical, providing various levels of detail depending on the situation. For example, a sales representative visiting an office building may desire to access various pieces of information using different levels of semantic location detail. At the highest level, the physical location of the sales representative is in a city. Additional levels of political divisions can be used (e.g., country, state, county, district) if applications so require. Additional levels of semantic detail include the particular building where a sales representative is located, the floor of the building, and a room on the floor. Applications may use varying levels of semantic location detail. For example, a sales order application, described in detail below, would not require detailed information regarding the particular room where a user is located, though this information may be useful for applications giving directions to restrooms or printers.

Context information may be used to improve the application's usability by reducing and simplifying user interfaces to better adapt desktop enterprise applications to mobile applications. In many applications, fields needed by enterprise applications are dependent on the location of a mobile device being used to enter data. For example, a sales representative meeting with a client and entering sales orders for that client may typically do so from within a client's business location. Much of the information needed by an enterprise order entry application includes client and billing identification and addresses. Because this information is fairly static for a particular client, the location of a mobile device used for entering sales orders may provide context that allows that information to be filled in, or at very least, more intelligent defaults given. By taking advantage of context information, information displayed and data entry needed may be substantially reduced.

Figure 1:
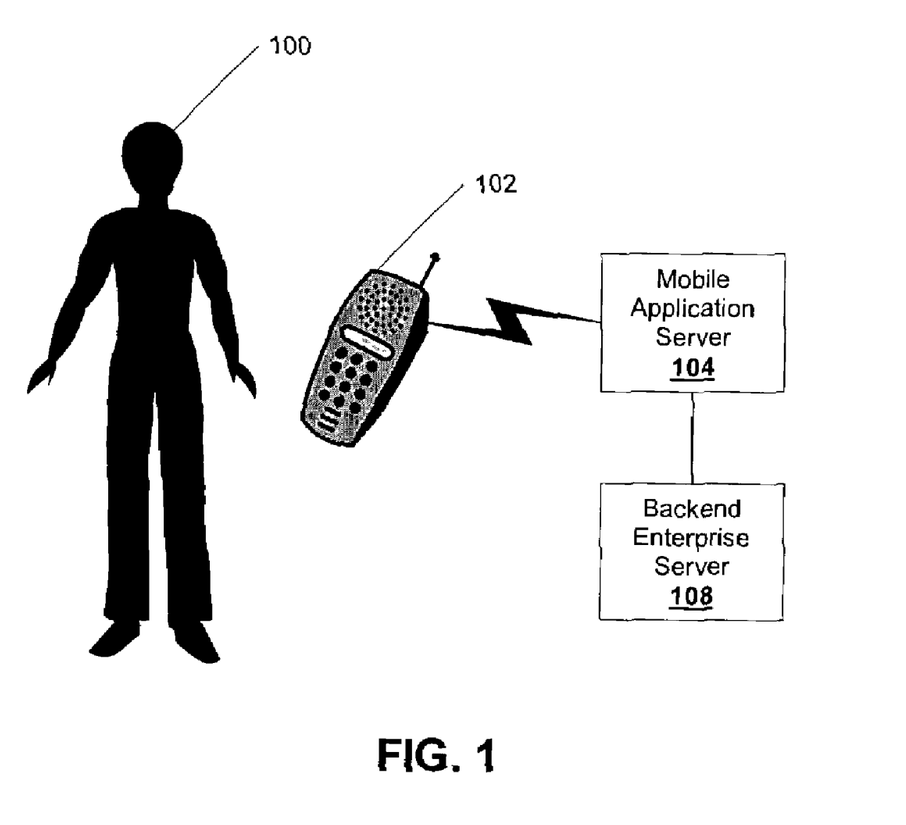
FIG. 1 is a block diagram of a system providing a context-aware mobile application.

FIG. 1 describes a context-aware sales order system designed to replace a legacy paper-based sales order system. In one exemplary paper-based system, sales representatives visited clients, recording orders using a paper form. The forms were then submitted to secretarial services once a week for data entry, where the forms were manually entered and transferred to a backend data processing system through a weekly batch job. The process was inefficient, time consuming, expensive, and error-prone. Sales representatives or support staff were forced to enter all of the data manually. Because the system operated in batch mode, it was unable to alert the sales representative as to problems with an order. Various problems may occur in the paper-based system. For example, at the time an order was placed, products may have been out of stock or discontinued, fewer than the requested quantity may have been available, or the customer may have been behind in payments. Because the system was offline, the user did not receive instant feedback, creating inefficiencies in the system workflow.

Because sales representatives, in this example, rely heavily on mobile communications to stay in touch with their office and their clients, a mobile telephone is an attractive candidate for providing a user interface to a sales order data processing system. Unfortunately, the small screen size and the difficulty of entering data in most mobile telephones makes it overly cumbersome to simply automate the paper forms previously used. By using contextual information in the application, the complexity of the user interface may be significantly reduced as is described in detail below.

One technique to reduce the amount of information that a user must enter is to simply replace some of the parameters with default values. For example, the order date may be assumed to be the present date, thus reducing the need for a sales representative to enter the current date.

Referring to FIG. 1, a user 100 is able to access data services using a mobile device 102. The mobile device 102 connects to a mobile application server 104 across a data communications network 106. Any data communications network may be used; however, in this implementation, data communications network 106 is a wireless network supplied by a wireless service provider. The mobile application server 104 provides an application platform to interact with backend enterprise server 108 across a network 110. Network 110 may be any data communications network, such as, a local area network (LAN), the Internet, or a wide-area network (WAN).

Mobile device 102 may be implemented using any mobile device technology. For example, mobile devices 102 include, but are not limited to, personal digital assistants (PDAs), mobile phones, laptops, pagers, and wireless email devices (e.g., Blackberry). Some implementations use the wireless access protocol (WAP) to provide platform-independent support for all mobile devices implementing a WAP browser.

In this implementation, mobile application server 104 provides a sales order system whereby a sales representative may input customer orders through mobile application server 104 to backend enterprise server 108. The order information may then be used by an order fulfillment system to facilitate delivery of the requested order to a client. In this implementation, user 100 is a sales representative and mobile device 102 is a wireless access protocol (WAP) enabled mobile telephone capable of accessing mobile application server 104 through GSM data services, which may include GPRS. The system identifies the location of mobile device 102 and uses the location information to simplify or reduce the complexity of a user interface.

Figure 2:
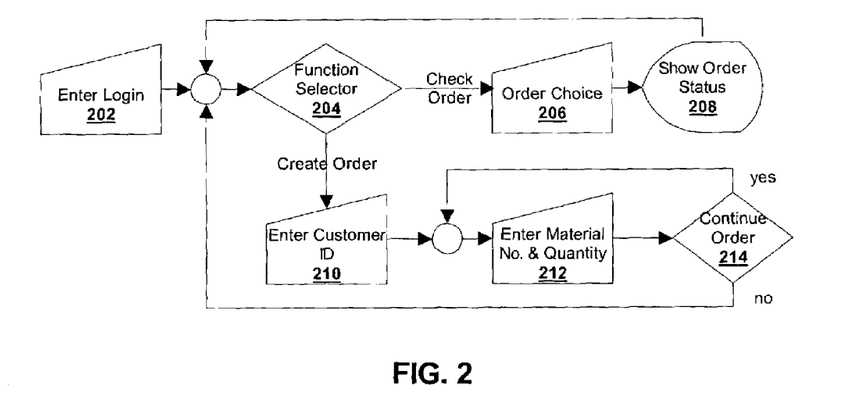
FIG. 2 is a flowchart of an order creation process in a sales order application.

FIG. 2 is a flowchart describing a order check and creation process used in a desktop implementation of the legacy sales order system. In this system, the sales representative takes orders from customers and then submits the order from his office or from a laptop connected to his office using an enterprise application. Typically, the printed order form contains a customer number, order date, delivery date, term of payment, the product numbers, and the quantity of each product ordered. The sales representative begins entering orders into the enterprise application by entering a login identification (step 202). In this implementation, the login process requests a username and password. Any technique may be used to identify the sales representative as security requirements vary, ranging from systems employing no security, to those requiring biometric data to provide maximum security. Once the sales representative has been identified, the system presents the sales representative with a selection of functions that can be performed (step 204). In this example, the sales representative may choose to check orders or create orders from a menu of options. If check order is chosen, the user is queried to select a particular order (step 206). The selected order is then displayed (step 208) and the selection of functions is displayed again (step 204).

If the sales represented opts to create an order, the system queries the user for a customer identifier (step 210). Then, the sales representative is queried for a material number and quantity (step 212). For example, the sales representative may enter the material number for green widgets along with the desired quantity. The system then queries the user to determine whether to continue adding to the order (step 214). If additional items need to be added, the system again queries the user for a material number and quantity (step 212). Once the order is complete, the system enters the order and again displays the selection of available functions (step 204).

Figure 3:
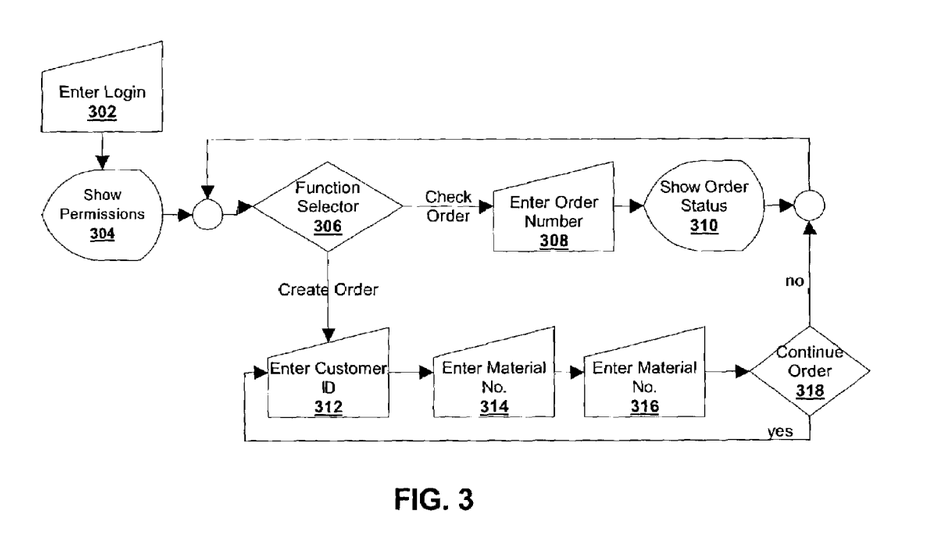
FIG. 3 is a flowchart of an order creation process modified for use in a wireless access protocol-based (WAP-based) system.

This process may be adapted to a WAP-based mobile application as shown by the flowchart in FIG. 3. While programming mobile devices with application-specific code may provide greater power and increased usability, the resulting system is typically greatly restricted as to the mobile devices that may be used with it. In this application, a WAP-enabled mobile telephone may be used as the mobile device to enter sales orders into a backend system and to check on the status of orders. In this implementation, the user begins by entering login information (step 302). The system receives the login request, processes it, and then displays the permissions available for that sales representative (step 304). The system then displays a menu of the available functions that may be performed (step 306). In this example, a sales representative may select to check the status of an order or to create a new order. If the sales representative opts to check on the status of an order, the system requests an order number (step 308). Once an order number is received, the system shows the status of the order (step 310), displaying the result on the screen of the WAP-enabled mobile device. When the user has completed review of the order status, the menu of available functions is displayed once again (step 304).

If the user instead selects to create a new order, the system queries the sales representative for a customer identification number (step 312), then for a material number (step 314), and finally for a quantity (step 316). The system then asks the sales representative whether the order is complete (step 318). If additional items need to be entered, the system again begins to query the user for the customer identification number (step 312), material number (step 314), and quantity (step 316). Once the order is complete, the system again displays a menu of available functions (step 304).

Figure 4A:
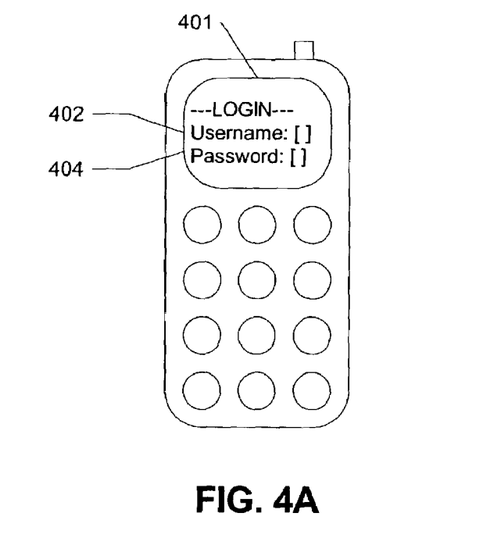
FIGS. 4A-4D are screenshots of a WAP-enabled mobile telephone carrying out the process shown in FIG. 3.

Referring to FIG. 4A, the sales order application a sales order application user interface first displays a login screen 401 to allow a sales representative to enter identifying information. The login screen includes a username field 402 and a password field 404.

Figure 4B:
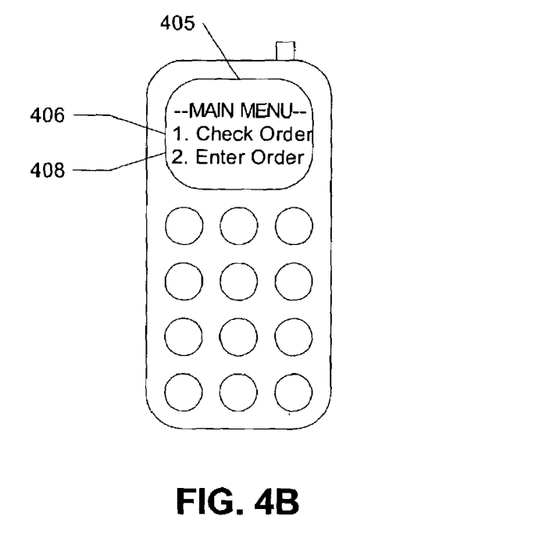

Referring to FIG. 4B, once a user logs on to the system, a main menu 405 is displayed giving the user the option to choose to check on the status of an order by selecting the first option 406 or to enter a new order by selecting the second option 408.

Figure 4C:
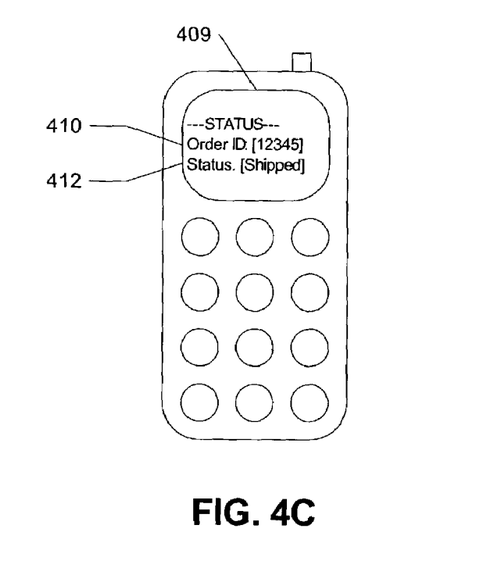

If the user selects the first option 406, the system displays an order status screen 409 as shown in FIG. 4C. The screen 409 if first displayed with field 410, allowing a sales representative to enter an order status number in field 410. When an order status is entered, the system queries a database to determine the status of the order and updates displays a new screen with the status display field 412.

Figure 4D:
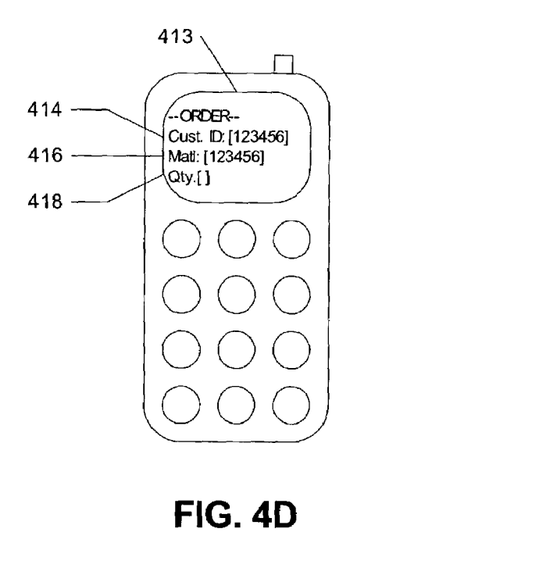

From the main menu screen 405 shown in FIG. 4B, a sales representative may also select the second option 408 to enter a new order. The customer order entry screen 413 is shown in FIG. 4D. The order entry screen 413 allows a sales representative to enter a customer identification number 414, a material or product number 416, and a quantity 418. In this implementation, customer identification number 414 is a 6 digit number unique to a particular customer. Customer identification numbers 414 may also be unique to a particular customer location. For example, a single client may have multiple retail locations. In this example, a single client identification number may be used for all locations, or separate client identification numbers may be provided to better facilitate accounting, billing, and delivery for the various offices.

Material or product number 416 identifies a particular product. In this implementation, a 6-digit product identification number uniquely identifies the product to be ordered. Finally, quantity 418 is typically a one or two digit number identifying the quantity of products corresponding to production number 416 ordered. Numbers are used for each of the fields shown in FIG. 4D because numbers are very easy to enter on a WAP-enabled phone. On average, a sales representative must enter 13.5 numbers (a 6-digit customer number, a 6-digit product number, and a 1 or 2 digit quantity). In practice, the average time for entering a number on a WAP phone is approximately 1.48 seconds. Thus, the overall time for entering an order is about 21 seconds. Even this process is too long and cumbersome for a sales representative. This model may be improved by using contextual data.

This implementation may be improved by using available context information. In this example, sales representatives typically enter customer orders at the customer's site. Thus, the location of the mobile device being used to enter the data may be used to identify the customer. If the customer is identified using the location information, then this data does not need to be entered by the sales representative. Using context information may significantly reduce the amount of data entry.

Figure 5:
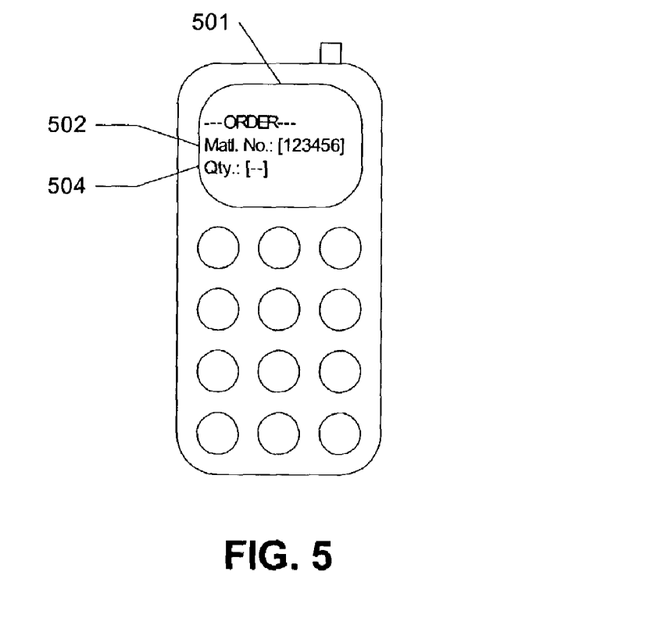
FIG. 5 is a screen shot of a reduced user interface using location context information.

Referring to FIG. 5, an improved user interface utilizes contextual information to further reduce manual input. Using the current location of the sales representative, the system is able to determine the customer identification number. Thus, the sales representative needs to enter only a product identifier 502 and a quantity 504. This can significantly reduce the order entry time. In this example, a sales representative enters on average 7.5 numbers, taking approximately 11 seconds. This is significantly less than the 21 seconds previously required. The system may also be implemented by displaying the appropriate customer identification number as a default based on location context information such that a user may easily change the value determined based on the mobile device's location. If the location context results in multiple options for a particular field (e.g., two customers locations are very close to one another), the system may allow a user to select the appropriate customer identification number from a list of possible or probable values.

Further contextual information may be used to replace the product number input field by a selection of appropriate products. Product lists are usually too large for displaying on a mobile phone. The contextual information allows the reduction of these lists based on context information and customer data stored in the backend, e.g., CRM system containing customer preferences, or supplied with the customer's context, e.g., the customer demand for certain products. For example, a customer may only purchase 3 different products. Instead of displaying a blank field for a sales representative to enter a number, the system can instead provide a list of the typical products. Thus, the sales representative need only enter a single selection to identify a product instead of a 6-digit product code. This would reduce the number of key presses to 1.5, taking less than 3 seconds. In this example, making the application context-aware significantly increases the usability and practicality of a mobile sales order system.

Figure 6:
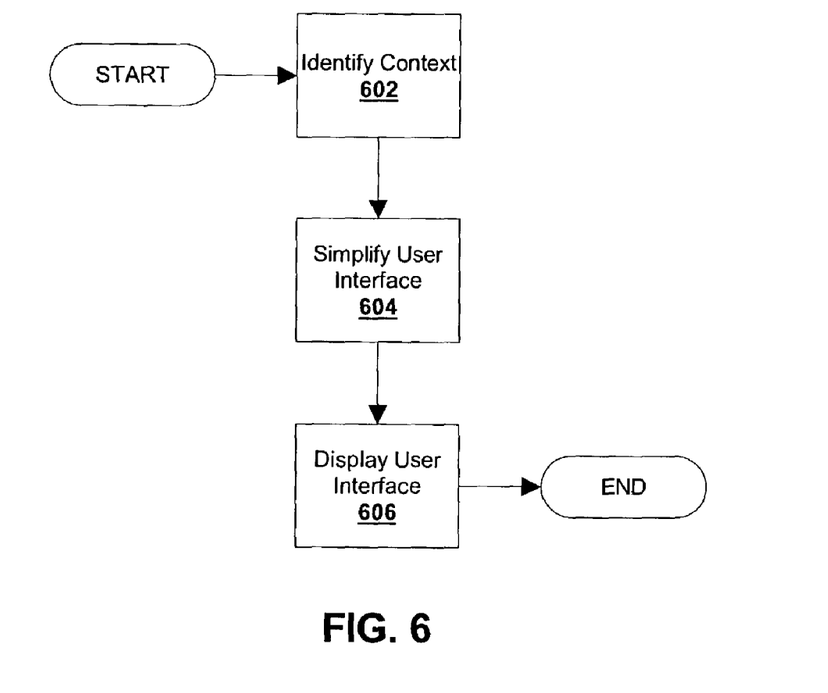
FIG. 6 is a flowchart of a process for reducing or simplifying user interfaces using location context information.

Referring to FIG. 6, as shown above, the use of location context awareness in mobile applications can significantly reduce the amount of data required to be entered by a user and the amount of data that must be displayed. Various techniques may be used to incorporate location context awareness into an application as will be described in detail below. First, we will consider how applications may obtain location information. In general terms, location context information may be integrated into a system by first identifying the location of a mobile device (step 602), using the location context information to simply a user interface (step 604), and then displaying the simplified user interface (step 606).

Before location information may be used, a particular location of a mobile device must be identified (step 602). Location information may be obtained by a mobile device 102, or it may be obtained by a server process external to the mobile device 102. One technique is to use a beacon emitting signals, such as, radio frequency signals or infrared signals. These signals may be received by the mobile device 102. The beacon may broadcast any location identifying information, such as, a geographical identifier (e.g., latitude and longitude of the beacon) or an abstract representation of a location (e.g., the street address of the beacon, the name of a store, a numerical identifier). For example, a beacon may broadcast a text string "WE1234" representing store number 1234 of the Widget Emporium. Using additional information within the system, typically stored on a backend enterprise business server, the location of the mobile device may be deduced. Context information regarding the location may then be used to simplify and improve data input and output for a user.

Alternatively, the mobile device may use positioning systems such as the Global Positioning System (GPS) or Loran to identify the latitude and longitude of the device. This provides the physical location of the device and can be used to find semantic location information based on its physical location. The semantic location information corresponding to physical locations may be stored in a database on the mobile device or may be stored elsewhere. For example, if the approximate latitude and longitude of each customer site is stored in a database, the present location of a mobile device may be used to deduce the most likely customer site by identifying the customer site closest to the latitude and longitude of the mobile device. Additional contextual information regarding the customer may then be retrieved and used to simplify and reduce a user interface.

Finally, a system may obtain the location of a mobile device using a system external to the mobile device. Some mobile telephone systems are capable of identifying the location of a phone using their system. For example, location information may be obtained from a service provider to identify the location of a mobile device. This information could be used in a manner similar to other physical location data.

The description of FIG. 6 illustrates the application of location context information in modifying user interfaces. The process illustrated by FIG. 6 also may be used with any other contextual information. For example, menus may be altered, for example, based on other environmental factors (e.g., barometric pressure, temperature, altitude, humidity), based on the user's present activity, or based on the status of the device and local information stored on the device.

Once the location of a mobile device has been determined, the system simplifies a user interface (step 604), such as, by removing fields that may be determined from context information, or by setting defaults based on context information. In the sales representative example, location context information identifies the customer contact information, allowing the entry of billing and shipping information to be removed from the user interface.

Location context information may also be used to reduce the number of choices that a user has. The user interface may be adjusted based on the number of choices to optimize the ease of information display and data entry. For example, if there are many items that a user may select (e.g., over 100 products), then it may be easiest and fastest for the user to enter a number identifying a particular choice. In the sales representative example, there are many products customers may purchase, so it is not unreasonable to require a user to enter a products number to select a particular product. However, if there are fewer products, the information may be better presented in as a list, allowing a user to select list items by entering a number corresponding to the location within the list or by using buttons to navigate through the list and pressing a select button to choose a selected item. If the list is too large (e.g., over about 20 items), it may be easier to make the list hierarchical. For example, a list of products may be divided into several categories. With a hierarchical list, the user is first presented with the highest level of categories. The user may navigate through the highest order, selecting a category. The contents of the selected category are then presented to the user. Each level in the hierarchy may contain either categories, items, or combinations of the two. The user may navigate through the hierarchy until the desired item is selected. In some implementations, the user interface is simplified using software running on the mobile device, in others, the interface is simplified by a remote server.

Once the user interface has been reduced or simplified, it may be provided to a user (step 606). The user interface may be implemented using any user interface techniques. For example, the user interface may be provided through a standalone application running on a mobile device. In some implementations, a WAP-enabled mobile phone is used as the mobile device. The WAP-enabled mobile phone can display web pages implementing a user interface. These web pages are typically provided by a mobile application server. Any user interface technology may use location context information in this manner to reduce the complexity of user interfaces.

Figure 7:
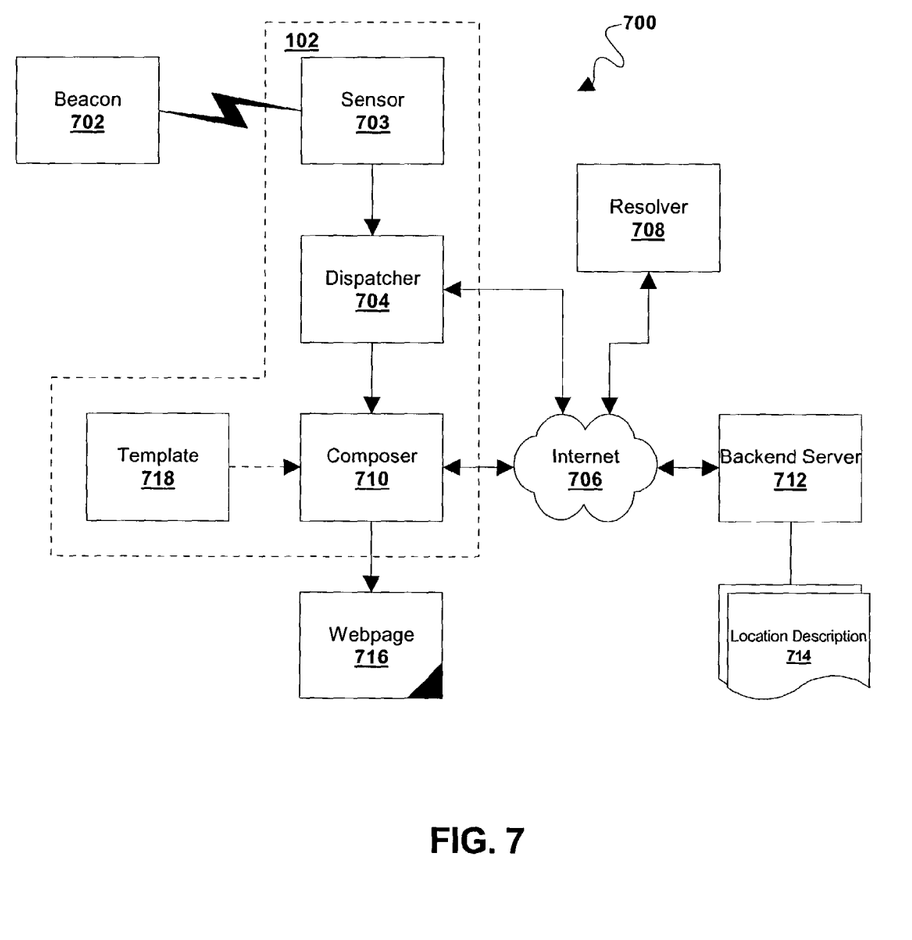
FIG. 7 is a block diagram of a system for providing context-aware mobile applications.

Referring to FIG. 7, an implementation of a sales representative system 700 includes an infrared (IR) beacon 702. Each customer location is provided with an IR beacon 702 configured to broadcast an identifier for that location. The beacon is implemented using a WindowsCE device such as a Compaq iPAQ H3600. The beacon searches for other IR devices within range and if it is successful, the beacon transmits a short message identifying its location. In this implementation, the message is transmitted as an XML tag with a location identifier as its attribute (e.g., "<beacon id='LocID'/>"). Any other IrDA compatible device capable of broadcasting small messages can be used in this implementation.

The IR message is received by a sensor 703 associated with the mobile device 102, which passes the received message to a dispatcher 704. The sensor 703 lists for incoming beacons on the infrared port. After receiving a beacon message, the location identifier is extracted and sent to the dispatcher 704. To provide other contextual information, other sensor modules 703 may be integrated with the system. For example, additional sensors may receive GPS signals, Loran signals, or other radio frequency signals.

Dispatcher 704 queries a web-based directory service by sending a request across a network, such as the Internet 706, to the resolver 708. The resolver 708 may be implemented as a servlet and the query from the dispatcher 704 to the resolver 708 may be sent as an HTTP GET request. In this implementation resolver 708 returns a uniform resource locator (URL) referencing location context information for the location corresponding to the location identifier from the beacon 702. The URL points to an extensible markup language (XML) resource describing the location, such as, the store where the beacon 702 is located or a more general place description.

The dispatcher 704 may also process different types of contextual information before sending the request to the resolver 708. For example, the dispatcher 704 may also use local information to determine user credentials and a mode of operation before submitting a request to resolver 708. Instead of simply providing a particular place, the system allows the user of contextual information to modify the behavior of an application. This technique can provide an interesting array of applications. For example, a single company may have multiple sales representatives specializing in different product lines that visit a single client. Instead of providing a order entry application based entirely on location, the order entry system may also incorporate contextual information regarding the identity of the sales representative. The needed context information may be collected by the dispatcher 704 and submitted to the resolver 708.

The context information is then used by composer 710 to generate a user interface. The dispatcher 704 passes the URL from resolver 708 to composer 710. Composer 710 uses the URL to query a backend server 712 through a network, such as the Internet 706, to obtain the needed location description 714. This information is typically stored as an XML document. When the available information is large, it may be advantageous to retrieve only the needed portions of the information. This may be accomplished using the XML Query Language (XQL). The composer 710 uses contextual information to generate web page 716 that is then displayed on the device. Relying on a standard XML document to describe a place makes the approach extensible and flexible, facilitating the addition of place data to a description.

In this approach, the mobile device decides, based on credentials of the current user role, which information to use from the location's XML description. For instance, a sales representative may have multiple roles at a single store; he or she may function as both a sales representative to the store and as a customer of the store. Such information may be stored in template 718 with credentials or roles bound to a set of templates that tell the composer how to create the default homepage using the location data. The sales order application itself is rendered in the backend server 712. Therefore, one template includes a HTTP request to the backend server 712 that also transmits a reference to the shop's virtual description. The reference is used to access the shop's XML description and to extract data to adapt the sales order application. For example, the customer number may be used for identifying the customer and the preparation of a product list from a customer relationship management (CRM) system.

Various templates may be implemented as HTML documents with special tags included allowing the composer 710 to query the backend server 712. In this example, two special tags are used: (1) "<TOIXMLURL/>" which gets replaced by the URL to the place's XML description; and (2) "<TOITIME/>" which is replaced by the time the page is created. Using these tags, the application may be implemented to provide web page 716. Web page 716 may use conventional GET and POST techniques to submit data to the backend server 712.

The sales representative implementation can be expanded to provide additional information. For example, as the sales representative approaches a store, the system can provide information including the current news, problems, special offers, and so on associated with the store. It can also provide alerts, like non-satisfying sales figures; recent orders; outstanding orders and bills; and other customer-related information, such as payment terms and special conditions.

In many applications, it is desirable to make contextually-obtained data manipulable by a user. For example, a sales representative entering a customer's store may receive a phone call from another customer and may need to create an order for the other customer. Applications may be implemented such that the sales representative may modify the customer identification to a value contrary to location context information.

Finally, additional techniques may be used to facilitate data entry. For example, radio frequency identification tags (RFIDs) provide a mechanism for objects to transmit information about themselves. In the sales representative application, a system could be provided such that product numbers are obtained by placing the mobile device near a RFID-tagged product. This would further reduce the data entry required to create a new order. A mobile device may be used in connection with a barcode scanner in a similar fashion. Optical recognition may also be integrated into implementation such that the system can recognize objects using, for example, optical recognition digital watermarks.

The techniques herein described may be used in any data processing application by adding location context to the system and by making the application aware of the location context. For example, a container warehouse stores bottles filled with various beverages. After production, the bottles are piled on pallets and temporarily stored in a very large container warehouse until the bottles are shipped to customers. Like most consumables, the bottles may be stored in the warehouse for a maximum period of time before shipping. If they are stored longer than this period, they must be cleaned, and perhaps discarded. An efficient warehouse management system benefits from knowledge of the exact location of every pallet of bottles.

The warehouse may be made take advantage of location context information by placing adding RFID tags to each pallet, as well as a tag reader and a location-aware computer system with backend integration to each forklift. When a new pallet is filled, the type of bottles, the production date, and the pallet's RFID tag are stored in a warehouse management system. Every time a forklift picks up a pallet, the pallet's RFID tag is read and a forklift-mounted computer shows the driver where to place the pallet. When the forklift drops the pallet, the exact position of the pallet is stored by the system. The physical position of the forklift may be provided using a differential GPS system.

The warehouse system may be implemented using the techniques described above. Every time a pallet is picked up or dropped, the exact location and the pallet ID stored within the pallet's RFID are required. This may be accomplished by integrating two additional sensor modules into the system. One module is responsible for processing the location data, and the other responsible for reading the data from the RFID and triggering further processing of the gained information.

Every time the forklift picks up a pallet, the driver needs to know what to do with the pallet. The information about the pallet must somehow be displayed on the forklift's display. To achieve this, the mobile device may generate an event forcing a browser to load a certain web page. An HTTP-based "Push" to the web browser would provide a suitable solution. Another technique that may be used is to provide an applet that loads a document when a signal is received by the mobile device.

The warehouse implementation procedure works as follows: (1) a forklift picks up or drops a pallet; (2) the pallet ID and the location are gathered by the corresponding sensors and transmitted to a resolver; (3) the resolver returns a URL pointing to a dynamically generated web page. This web page may then be loaded, updating the operator of the forklift with the current status or task to be carried out. In this manner, a backend server can be made location context aware.

Figure 8:
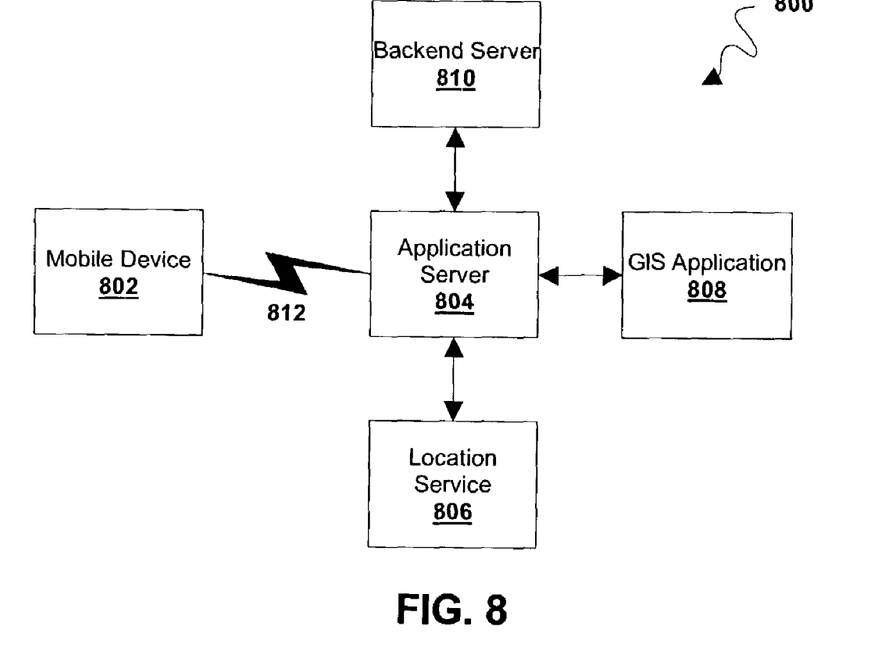
FIG. 8 is a block diagram of a context-aware mobile application using a geographical information system (GIS) application.

Referring to FIG. 8, a mobile application, such as the sales order application described above, may be integrated with a geographical information system (GIS) application to provide additional contextual information and improving user interfaces of mobile applications. In this mobile application system 800, a mobile device 802 connects through a network 812 such as, for example, a GSM network, to an application server 804. The system 800 uses a location service 806 through the application server 804 to determine an approximate or exact location of mobile device 802. Once the application server 804 has access to the location of mobile device 802, the application server 804 may use that information to query a GIS application 808 to improve and simplify the user interface of an application provided to mobile device 802. In addition to information obtained from the GIS application 808, the application server also may interact with backend server 810.

Mobile device 802 provides interaction with a user. The mobile device 802 may be implemented using any mobile device such as, for example, a mobile phone or wireless personal digital assistant (PDA). The mobile device 802 facilitates a user interface to the mobile application. For example, a mobile phone may include a wireless access protocol (WAP) browser installed on the phone to provide a user interface for the communication between the phone and the application server 804. The application server 804 may be implemented using any development platform such as, for example, a SAP R/3 system and a SAP Web Application Server to provide a fully J2EE-complaint infrastructure.

In some implementations, the application server 804 may be used with a gateway system, such as a WAP gateway (e.g., Nokia Active Server). The WAP gateway may be used to provide connectivity between WAP-enabled mobile devices 802 and the application server 804.

In some implementations, the mobile device 802 directly accesses location service 806 without the assistance of application server 804. For example, the mobile device 802 may include a built in global positioning system (GPS) receiver. The GPS receiver may be used as location service 806 to determine the latitude and longitude of the mobile device 802. This location information may then be used by the GIS application 808 which may respond to various queries regarding geographical information. For example, the GIS application 808 may map a particular location to a list of customers.

The application server 804 also may access backend server 810 to retrieve various information such as, for example, user profiles or customer data. The backend server 810 may provide access to information including customer relationship management (CRM) information, enterprise resource planning (ERP) information, and supply chain management (SCM) information. In addition, multiple backend servers 810 may be used so that the application server 804 may obtain information from a variety of data sources.

Figure 9:
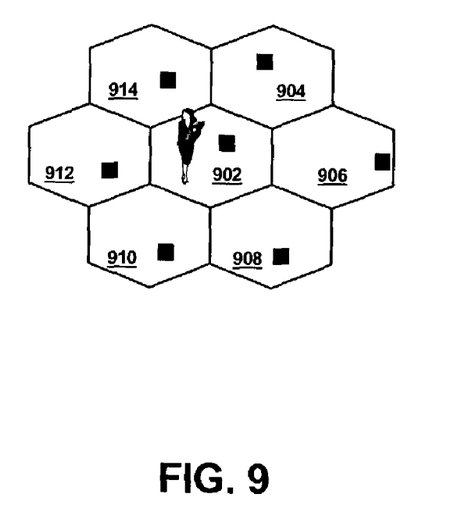
FIG. 9 is a diagram describing the operation of a location service to find the geographical location of a mobile device.

Referring to FIG. 9, the location service 806 may differ based on the mobile device technology. For example, if mobile device 802 is a GSM mobile phone, location information may be obtained from the GSM network. The GSM network infrastructure is an earth-bound infrastructure that consists of fixed base transceiver stations (BTSes) that communicate with mobile GSM terminals (e.g., GSM mobile phones) across a radio link. The collection of BTSes are the basis for location-based services in a GSM system. A phone's location is calculated relative to those BTSes for which the operator knows the location.

For example, a user located within cell 902 using a GSM mobile device 802 broadcasts and receives communication with one or more BTSes. The BTSes divide the network into cells (e.g., cells 902, 904, 906, 908, 910, 912, and 914) identified by a cell identifier. While there might be several BTSes in range, the phone is always registered to the single BTS with the best signal. One way to provide location service 806 is using the cell identifier of the registered BTS to approximately identify the closest BTS. If the location of that BTS is known, the location of the mobile device 802 may be assumed to be in the same approximate location. The accuracy of this method depends on the cell size and may have widely varying accuracy, since the typical GSM cell is anywhere between 2 to 20 kilometers in diameter.

Several approaches may be used to provide a more accurate location service 806. Some approaches use a network-based, handset-assisted approach in which the network determines the location with some assistance from the mobile device 802. Other approaches use a handset-based, network-assisted approach. For example, a network-based, handset-assisted approach may be implemented by measuring the arrival time of GSM packets sent from a mobile device 802. The signal is received from a set of BTSes at different times due to the signal delay. From these delays the relative positioning of the device with respect to the BTS is triangulated. Since the absolute locations of all BTSes are known the relative position can be transformed into geographic coordinates. Network-based solutions work when supported by the network; however, many GSM networks do not make this information available for use in mobile applications.

Handset based solutions may be implemented for GSM by relying on the power-levels the phone measures on the air interface to triangulate the device's positioning. GSM devices do measure the signal strength of the radio link from nearby BTSes in order to facilitate hand-over decisions. Whenever the signal quality of the BTS a device is registered to drops below a certain level, the BTS with the best signal quality is chosen to become the next registered BTS.

A GSM terminal stores a list of surrounding BTSes and their signal strength in a memory within the terminal.

The subscriber identity module (SIM) is a smart card that is primarily used for user authenticating. SIM cards reside inside the mobile terminals and may communicate with the GSM network using the short messaging service (SMS). A handset-based, network-assisted location service 806 includes a portion residing on the SIM cards to access the cell lists as well as their field strength and return it to the application server 804 upon request by tunneling the information through SMS. Network assistance is used to associate cell lists to GIS coordinates. The combination of the cell identifiers and their field strength as well as information about the BTSes' positions and the topology of these surrounding area allows the tracking of devices within an area. The precession of the tracking depends on the density of the BTSes.

The major advantage of the approach is that it allows locating mobile devices 802 with a decent precision at low cost. The mobile devices 802 and the GSM network stay untouched and the communication via SMS is very cost efficient. Only mapping services of cell identifiers and field strengths need to be added to enable the location services.

Figure 10:
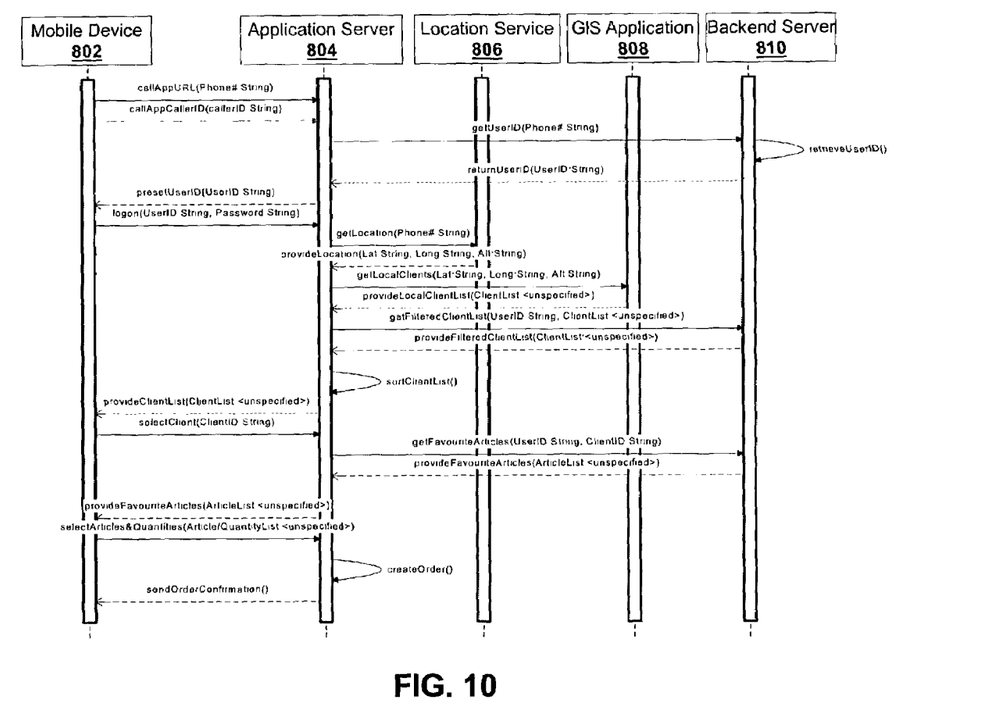
FIG. 10 is an interaction diagram showing an exemplary interaction sequence between the components shown in FIG. 8.

FIG. 10 is an interaction diagram illustrating an exemplary application flow for a modified sales order application system. In this implementation, the mobile device 802 is a GSM mobile phone. GSM systems may include a GSM location service to determine the location (e.g., latitude, longitude & altitude) of a phone for a given telephone number (MSISDN number).

In the implementation shown in FIG. 10, a user may access the sales order application using a WAP-enabled mobile phone (mobile device 802) by calling a uniform resource locator (URL) identifying the application. A WAP browser running on the WAP-enabled mobile phone sends a request to the applications server 804. The request includes user identification information. The user identification is submitted ether as MSISDN number (callAppURL(Phone#: String)) or as a parameter encoded in the URL identifying the application (callAppCallerID(CallerID:String)). If user identification information was not encoded in the URL, the application server 804 resolves the user identification from the MSISDN number.

The mappings between MSISDN numbers and phone numbers are stored by the backend server 810. The MSISDN number is the telephone number of the mobile device 802. Because each sales representative has a mobile device 802 with a unique telephone number, the telephone number of the device 802 may be used to uniquely identify the sales representative within the system 800. The retrieveUserID( ) function retrieves the ID (retrieveUserID( ) from a database associated with the backend server 810, which is returned to the application server 804 (return UserID(UserID:String)). The application server 804 completes the login dialog with the user name and returns it to the user (presentUserID (UserID:String)).

After the user completes the logon with a password (or using any other authentication technique) the user name and password are posted to the application server 804, which starts collecting contextual information (logon(UserID: String, Password:String)). First the application server 804 queries the location service 806 for the current position of a phone using the MSISDN number (getLocation(Phone#: String)). In this example, GSM mobile phones are used and the GSM location service provides the location service 806 functionality. The location service 806 returns the location (provideLocation(Lat:String, Long:String, Alt:String)).

However latitude, longitude, and altitude coordinates are not very useful on the application level. For application level data (e.g., the customers in that area) the geographical coordinates are transmitted to a GIS application 808 (getLocalClients(Lat:String, Long:String, Alt:String)) that returns an ordered list of clients (provideLocalClientList (ClientList)).

The customer list may be reduced by verifying the customers in the list against the sales representative's customer base to remove customers of the company that are not served by the sales representative. The user identifier and the customer list is transmitted to the backend server 810 (getFilteredClientList(UserID:String, ClientList)) that filters the list and returns the filtered list to the application server 804 (provideFilteredClientList(ClientList)). The list is sorted (sortClientList( )) and presented to the user (provideClientList(ClientList)) so that the user may select a desired customer from the list (selectClient(ClieniID:String)). If only one customer is available in the list, that customer may be displayed without requiring the user's explicit identification.

After a customer is selected, the application server 804 queries the backend server 810 for a list of products (getFavouriteArticles(UserID:String ClientID:String)) corresponding to that client. The list may be calculated based on information such as the purchasing history of the customer, and the products sold by the sales representative. The list is returned form the backend server 810 to the application server 804 (provideFavouriteArticles(ArticleList)) and presented to the user (provideFavouriteArticles(ArticleList)).

The sales representative then selects a product and an order amount. The request is posted to the application server 804 (selectArticles&Quantities(Article/QuantityList)), which tries to place the order based on the given information (createOrder( )) and returns a confirmation message (sendOrderConfimation( )).

The GIS application 808 provides a mechanism to respond to geospatial business queries, such as, "Show me all customers in a radius of x meters of location y" as shown in FIG. 10 (getLocalClients). The GIS application 808 may be implemented on top of a database or application server to provide GIS query functionality. In order to enable such a GIS application 808, customer addresses may be geocoded so that the customers' locations may be queried or compared. One way to geocode addresses is to map each customer address to a standardized latitude, longitude, and altitude data set, which is then stored as part of a customer record in a database. A variety of geocoding software tools and services are available to perform this task either in batch or real-time modes.

In the implementation shown in FIG. 8, the application server 804 sends the current user location to the GIS application 808 that has access to a customer data base that has been geocoded. Based on the user location, the GIS application 808 is able to select only those customers that are within a given radius of the user location and returns only the selected records to the application. The size of this selection radius should be chosen to be at least as much as the absolute minimal precision of the user location data plus the absolute minimal precision of the customer location data in order to make sure that all local customers are selected by the GIS application 808. For example, if the minimal precision of a given user location $UL_{min}$ is ±3 kilometers and the minimal precision of a geocoded customer address $CL_{min}$ is ±1 kilometers, the selection radius should be at least $ABS(UL_{min})+ABS(CL_{min})=4$ kilometers. If the selected radius is less than 4 kilometers, then the system may fail to identify a customer location that is but 4 meters from the mobile device 802.

On the other hand, it is not desirable to choose a radius that is so large as to include an exorbitant number of customers. In order to minimize the number of selected customers and thus the number of selectable entries for the user of the mobile device, the system may dynamically adapt the size of the selection radius based on current precision data. Fortunately, one can reasonably expect a correlation between the local density of customer locations and the precision of GSM-based location services. For example, in a city with many small GSM cells, the precision of a GSM-based location service 806 as well as the density of customer locations is typically higher than in a rural area. This allows for smaller selection radii in cities and bigger selection radii in rural areas both resulting in a high accuracy of selected customer locations while minimizing the number of selectable records for the user.

Another way to optimize selected customer lists is to have the GIS application 808 sort the returned lists by increasing distance from the user location, so that the probability for the user to find the current customer on top of the resulting list is as high as possible.

In mobile application system 800, the mobile device 802 sends a request to application server 804 using a WAP browser. In a handset-enabled location service 806, the application server 804 may interact with an application stored in the SIM card on the mobile device 802 using SMS. The application accesses the cell identifier/field strengths list and returns it via the mobile terminal to through the SMS system, returning the list to the application server 804. The GIS application 808 may be used to translate the set of BTS identifiers and field strengths into GIS coordinates. In the sales order entry scenario, the application server 804 queries the GIS application 808 for customers within a certain range. The GIS application 808 accesses its database and returns a list of nearby customers from which a WML document is created and finally returned to the mobile device 802.

As discussed above, a user interface may be improved through the use of contextual information, such as user profiles and customer data, in combination with location information. Besides the different interaction schemas this multi-dimensional approach supports the adoption of application based on the experience of the user with a specific application as well as with a specific device or interaction schema. For example, a user not familiar with a desktop application may need support by the system to explain what to put in the different fields, while needing no help as to use the screen, keyboard and mouse. In a fully VoiceXML-based application, a user familiar with the application may need more support with the interaction schema (e.g. the system advises the user "you can say the number or type into the keyboard").

Information about users and customers may be stored in a database server of an enterprise application. Because of the dynamic nature of much enterprise data, such systems may use transactional databases. While transactional databases provide many advantages, their added functionality sometimes adversely impacts performance. In many cases, user interfaces may access predominantly static data where transactional database functionality is not needed. Data may be extracted out of the backend server 810, mapped to a data model and stored in a lightweight directory access protocol (LDAP) enabled directory server. The synchronization of these data storage devices may take place in a batch process in defined intervals.

A number of implementations have been described. Nevertheless, it will be understood that various modifications may be made without departing from the spirit and scope of the invention. Accordingly, other implementations are within the scope of the following claims.

What is claimed is:

1. A location context-aware system integrating geographical contextual information, the location context-aware system comprising:
    a backend enterprise server executing an enterprise application, the enterprise application including an enterprise user interface;
    a mobile device configured to interact with the enterprise application via manual input;
    a location service operable to determine location context information of the mobile device;
    a mobile application server in communication with the backend enterprise server and the mobile device, the mobile application server configured to generate a simplified user interface based on the enterprise user interface and the location context information, the simplified user interface comprising at least one field of the enterprise user interface which is pre-populated or not rendered based on the location context information, and further configured to transmit the simplified user interface to the mobile device.

2. The system of claim 1 wherein the enterprise user interface is configured to input customer data.

3. The system of claim 1 wherein the mobile application server generates a simplified user interface by hiding a user input field of the enterprise user interface from the user.

4. The system of claim 1 wherein the mobile application server generates a simplified user interface by populating a user input field of the enterprise user interface with a value.

5. The system of claim 1 wherein the mobile application server generates a simplified user interface by providing a selection of possible values for a user input field of the enterprise user interface.

6. The system of claim 1 wherein the mobile device is a personal digital assistant (PDA).

7. The system of claim 1 wherein the mobile device is a mobile telephone.

8. The system of claim 1 wherein the mobile device is a mobile phone and the location service is network-based, handset-assisted.

9. The system of claim 1 wherein the mobile device is a mobile phone and the location service is handset-based, network-assisted.

10. The system of claim 1 further comprising a geographical information service application, wherein the mobile application server generates a simplified user interface by querying the geographical information service application to determine business process data related to the location context information of the mobile device.

11. A method of modifying a user interface of an enterprise application using location context information, the method comprising:
    executing an enterprise application, the enterprise application including an enterprise user interface;
    determining location context information of a mobile device;
    providing the enterprise user interface to a mobile application server;
    generating a simplified user interface at the mobile application server based on the enterprise user interface and the location context information, the simplified user interface comprising at least one field of the enterprise user interface which is pre-populated or not rendered based on the location context information;

transmitting the simplified user interface from the mobile application server to the mobile device; and accepting a manual input on the mobile device via the simplified user interface, the manual input interacting with the enterprise application.

12. The method of claim 11 wherein determining the location context information of the mobile device includes querying a location.

13. The method of claim 12 wherein the location service is based on the mobile device.

14. The method of claim 11 wherein generating the simplified user interface further comprises hiding a user input field of the enterprise user interface from display.

15. The method of claim 11 wherein generating the simplified user interface further comprises populating a user input field of the enterprise user interface with a set value.

16. The method of claim 11 wherein determining location context information of the mobile device includes querying a geographical information service application with a query that includes a geographical location.

17. A computer program tangibly embodied in a computer-readable storage medium for providing a location context-aware user interface of an enterprise application on a mobile device, the computer program comprising:

an execution code segment to execute an enterprise application, the enterprise application including an enterprise user interface a location determination code segment to determine location context information of a mobile device;

a provision code segment to provide the enterprise user interface to a mobile application server;

a user interface generation code segment to generate a simplified user interface at the mobile application server based on the enterprise user interface and the location context information, the simplified user interface comprising at least one field of the enterprise user interface which is pre-populated or not rendered based on the location context information;

a transmission code segment to transmit the simplified user interface from the mobile application server to the mobile device; and an accepting code segment to accept a manual input on the mobile device via the simplified user interface, the manual input interacting with the enterprise application.

18. The system of claim 2, wherein the enterprise user interface is an interface with which to input customer data to a customer relationship management application.

* * * * *